US011325328B2

(12) United States Patent
Brandl et al.

(10) Patent No.: US 11,325,328 B2
(45) Date of Patent: May 10, 2022

(54) MOULD FOR PRODUCING A FIBRE COMPOSITE COMPONENT

(71) Applicant: Bayerische Motoren Werke Aktiengesellschaft, Munich (DE)

(72) Inventors: Reinhard Brandl, Elsendorf (DE); Bernhard Glueck, Fuerstenfeldbruck (DE); Juergen Hoffmann, Holzkirchen (DE); Jan Schuette, Munich (DE); Katrin Krukowski, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/283,558

(22) Filed: Oct. 3, 2016

(65) Prior Publication Data
US 2017/0021577 A1    Jan. 26, 2017

Related U.S. Application Data

(63) Continuation of application No. PCT/EP2015/052926, filed on Feb. 12, 2015.

(30) Foreign Application Priority Data

Apr. 4, 2014    (DE) ............... 10 2014 206 500.3

(51) Int. Cl.
*B29C 70/54* (2006.01)
*B29C 33/46* (2006.01)
(Continued)

(52) U.S. Cl.
CPC ............ *B29C 70/541* (2013.01); *B29C 33/46* (2013.01); *B29C 33/56* (2013.01);
(Continued)

(58) Field of Classification Search
CPC ....... B29C 70/541; B29C 33/46; B29C 33/56; B29C 33/0022
(Continued)

(56) References Cited

U.S. PATENT DOCUMENTS

| 4,431,397 A | * | 2/1984 | Fried | ................. B29C 33/34 |
| | | | | 425/384 |
| 5,044,918 A | * | 9/1991 | Brussel | ................. B29C 70/541 |
| | | | | 425/397 |

(Continued)

FOREIGN PATENT DOCUMENTS

| CN | 102917849 A | 2/2013 |
| CN | 103328191 A | 9/2013 |

(Continued)

OTHER PUBLICATIONS

J.R. Davis, Surface Engineering for Corrosion and Wear Resistance, ASM International, Mar. 2001, p. vii to p. 3.*

(Continued)

*Primary Examiner* — Matthew J Daniels
*Assistant Examiner* — Hana C Page
(74) *Attorney, Agent, or Firm* — Crowell & Moring LLP

(57) ABSTRACT

A tool for producing a fiber composite component includes at least two tool portions which have partial cavities and which are moved together in a production position in such a manner that they form a cavity, in which cavity the fiber composite component is produced. Associated with at least a first tool portion there is a retention element which retains the fiber composite component produced in the first tool portion when the tool portions are moved apart after the production of the fiber composite component.

7 Claims, 3 Drawing Sheets

(51) Int. Cl.
  *B29C 37/00* (2006.01)
  *B29C 33/56* (2006.01)
  *B29K 105/06* (2006.01)
  *B29L 31/30* (2006.01)
(52) U.S. Cl.
  CPC ...... *B29C 37/0007* (2013.01); *B29K 2105/06* (2013.01); *B29L 2031/30* (2013.01)
(58) Field of Classification Search
  USPC ....................................................... 156/500
  See application file for complete search history.

(56) References Cited

U.S. PATENT DOCUMENTS

| | | | |
|---|---|---|---|
| 6,942,261 B2 * | 9/2005 | Larsen | B60R 19/32 180/274 |
| 7,895,746 B2 * | 3/2011 | Bech | B29C 66/54 29/889.7 |
| 2002/0058081 A1 | 5/2002 | Masui et al. | |
| 2006/0034967 A1 * | 2/2006 | Habisreitinger | B08B 9/035 425/436 R |
| 2011/0085911 A1 * | 4/2011 | Schroder | B29C 70/541 416/223 R |
| 2011/0291325 A1 * | 12/2011 | Mattia | B29C 70/462 264/294 |
| 2013/0101694 A1 * | 4/2013 | Theinert | B29B 11/16 425/383 |
| 2013/0334734 A1 | 12/2013 | Takahashi | |
| 2015/0258743 A1 * | 9/2015 | Lanard | B29C 70/48 264/257 |

FOREIGN PATENT DOCUMENTS

| | | | | |
|---|---|---|---|---|
| DE | 689 25 108 T2 | 5/1996 | | |
| DE | 102 19 276 A1 | 11/2003 | | |
| DE | 10219276 A1 * | 11/2003 | ............ | B08B 9/035 |
| DE | 10 2010 052 597 A1 | 5/2012 | | |
| DE | 10 2011 108 219 A1 | 1/2013 | | |
| DE | 10 2012 019 958 A1 | 4/2013 | | |
| DE | 10 2011 057 033 A1 | 6/2013 | | |
| DE | 10 2011 087 862 A1 | 6/2013 | | |
| DE | 10 2011 121 883 A1 | 6/2013 | | |
| DE | 102013215375 * | 8/2013 | | |
| EP | 1 800 826 A2 | 6/2007 | | |
| EP | 2 308 670 A1 | 4/2011 | | |
| FR | 2 843 065 A1 | 2/2004 | | |
| FR | 2843065 A1 * | 2/2004 | ............ | B29C 33/14 |
| FR | 2 926 241 A1 | 7/2009 | | |
| JP | WO 2013054816 A1 * | 4/2013 | .......... | H01M 2/0262 |

OTHER PUBLICATIONS

Chinese-language Office Action issued in counterpart Chinese Application No. 201580003419.5 dated Apr. 17, 2017 with English translation (14 pages).
Chinese-language Office Action issued in counterpart Chinese Application No. 201580003419.5 dated Jan. 24, 2018 with English translation (Thirteen (13) pages).
Chinese-language Office Action issued in counterpart Chinese Application No. 201580003419.5 dated Jun. 28, 2018 with English translation (10 pages).
German Search Report issued in counterpart German Application No. 10 2014 206 500.3 dated Nov. 17, 2014 with partial English translation (12 pages).
International Search Report (PCT/ISA/210) issued in PCT Application No. PCT/EP2015/052926 dated May 4, 2015 with English translation (seven pages).
German-language Written Opinion (PCT/ISA/237) issued in PCT Application No. PCT/EP2015/052926 dated May 4, 2015 (five pages).

\* cited by examiner

MOULD FOR PRODUCING A FIBRE COMPOSITE COMPONENT

CROSS REFERENCE TO RELATED APPLICATIONS

This application is a continuation of PCT International Application No. PCT/EP2015/052926, filed Feb. 12, 2015, which claims priority under 35 U.S.C. § 119 from German Patent Application No. 10 2014 206 500.3, filed Apr. 4, 2014, the entire disclosures of which are herein expressly incorporated by reference.

BACKGROUND AND SUMMARY OF THE INVENTION

Embodiments of the invention relate to a tool for producing a fiber composite component.

Fiber composite components are increasingly used in industry, for example, in the automotive industry. The production of the fiber composite components can be carried out in different manners, wherein it is typically produced by means of a pressing method. This pressing method is intended to be understood to be inter alia a pre-preg pressing operation as well as a wet pressing operation. During the wet pressing operation, a fluid resin is applied to a dry textile semi-finished product and pressed within the tool so that the fiber composite component is produced. The wetting of the dry textile semi-finished product can take place before or after the textile semi-finished product has been inserted. In contrast, during the pre-preg pressing operation, there is used an already pre-impregnated textile semi-finished product which is pressed in a tool. Subsequently, the fiber composite components harden in the tool.

In order to produce a fiber composite component, there is typically used a tool which comprises two tool portions, conventionally tool halves, which can be moved relative to each other. The tool halves are constructed in such a manner that in the state moved together they form a cavity. In order to produce the fiber composite component, the (for example, pre-impregnated) textile semi-finished product is first placed in one of the two tool halves and, during the wet pressing operation, wetted with fluid resin. Subsequently, the second tool half is moved relative to the first tool half in such a manner that the cavity is formed. The pressing method now begins. After the pressing operation and the hardening of the fiber composite component, the two tool halves are moved apart again so that the fiber composite component can be removed. Typically, the tool halves have ejectors by means of which the completed fiber composite component can be ejected.

When the two tool halves are moved apart, there is no defined and reliable positioning of the fiber composite component produced in one of the two tool halves, whereby there is a delay in the production process of the fiber composite component.

An object of the embodiments of the invention is to provide a tool for producing a fiber composite component with which it is possible to define the position of the fiber composite component produced in one of the tool halves.

This and other objects are achieved with a tool for producing a fiber composite component having at least two tool portions which have partial cavities and which are moved together in a production position in such a manner that they form a cavity, in which the fiber composite component is produced, wherein there is associated with at least a first tool portion a retention element which retains the fiber composite component produced in the first tool portion when the tool portions are moved apart after the production of the fiber composite component.

In one embodiment, the invention retains the fiber composite component with the retention element after it has been produced in an associated tool portion. It is thereby ensured that the fiber composite component produced is always in the tool portion which is favorable in terms of process technology, whereby the production process can be accelerated since no manual removal from the "incorrect" tool portion is required. There is thus a higher degree of automation in the production. Furthermore, one of the two ejectors which are otherwise used on both tool portions can be saved since there is now a defined position of the fiber composite component produced.

An aspect of the invention makes a provision for the retention element to be able to be moved, in particular pivoted, between an initial position and a retention position. The retention element takes up its initial position when the tool portions are moved together in order to form the cavity. As soon as the fiber composite component has been produced and the tool portions are intended to be moved apart, the retention element moves from the initial position thereof into the retention position in order to fix the finished fiber composite component in the associated tool portion.

According to another aspect of the invention, there is a provision for the retention element to be able to be actuated pneumatically, hydraulically or electrically, in particular to be a pneumatically, hydraulically or electrically actuatable tensioner. Via the various embodiments which serve to drive the retention element, it is possible to determine the speed at which the retention element moves from the initial position thereof into the retention position. Via the construction of the retention element as a tensioner, a purely mechanical sequence from the initial position into the retention position is ensured. This ensures that the retention element independently reaches the retention position. The susceptibility to malfunction is accordingly reduced. However, the retention element can be moved into the initial position pneumatically, hydraulically or electrically.

Another aspect of the invention makes a provision for the tool portions each to have surfaces with which the fiber composite component to be produced is in contact. The surfaces delimit the cavity in which the fiber composite component is produced. In order to facilitate the removal of the fiber composite component produced from the respective tool portion, the surfaces have a slight roughness. The roughness of the surfaces is more than 400 grain, typically between 800 and 1000 grain, in particular above 1000 grain. A high-gloss polish has roughness values of from 800 to 1000 grain, whereas a roughness from 1000 grain corresponds to a mirror polish, for example, a diamond grinding paste.

The surfaces may be coated. Via the coating of the surfaces, on the one hand, the roughness is adjusted and, on the other hand, a materially integral connection is prevented from occurring between the fiber composite component and one of the tool portions during the production operation.

In particular, the surfaces are plasma-nitrided or chromium-plated. A particularly high-quality surface of the tool portions in the region of the partial cavities is thereby achieved. Via the plasma-nitriding operation, a mirror polish can be achieved.

Embodiments of the invention also make a provision for the tool to have a removal element which removes the fiber composite component produced from the tool. Since it is ensured that the fiber composite component produced is always located in a predefined tool portion, the production process can be further automated. The removal element can be associated with the predefined tool portion.

According to an aspect of the invention, the removal element comprises at least one vacuum suction device via which the fiber composite component produced can be removed. With the vacuum suction device, simple and reliable removal of the fiber composite component produced is ensured and minimizes the risk of damage to the fiber composite component during removal.

The removal element may be a robot, in particular a robot with a movable arm. The automation of the production process is thereby further advanced since the fiber composite component produced can be transported via the movable arm to another processing station.

At least one air ejector may be provided in at least one of the tool portions. The air ejector also supports under some circumstances the positioning of the fiber composite component in the defined tool portion by pressing the fiber composite component produced into the other tool half via an air blast. Furthermore, the air ejector may support the removal of the completed fiber composite component from the tool by the air ejector acting on the fiber composite component produced with an air blast from the predefined tool portion so that it is released from the surface.

In particular, a retention element may be provided in both tool portions. Via the two retention elements, the finished fiber composite component can be released from the tool in a simple manner. The two retention elements may to this end be controlled in a time-delayed manner. Firstly, the tool portions are moved apart, wherein the second retention element retains the fiber composite component in a tool portion which does not correspond to the predefined tool portion. The fiber composite component is thereby released from the predefined tool portion when the tool portions are moved apart. Subsequently, the tool portions can be moved together again, wherein the second retention element moves into its initial position and there is actuated the first retention element which retains the fiber composite component in the predefined tool portion. The transfer can also be carried out without being moved together again so that the transfer is carried out only by means of a change of the retention elements. This embodiment may support the air ejectors or be an alternative to the air ejectors.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
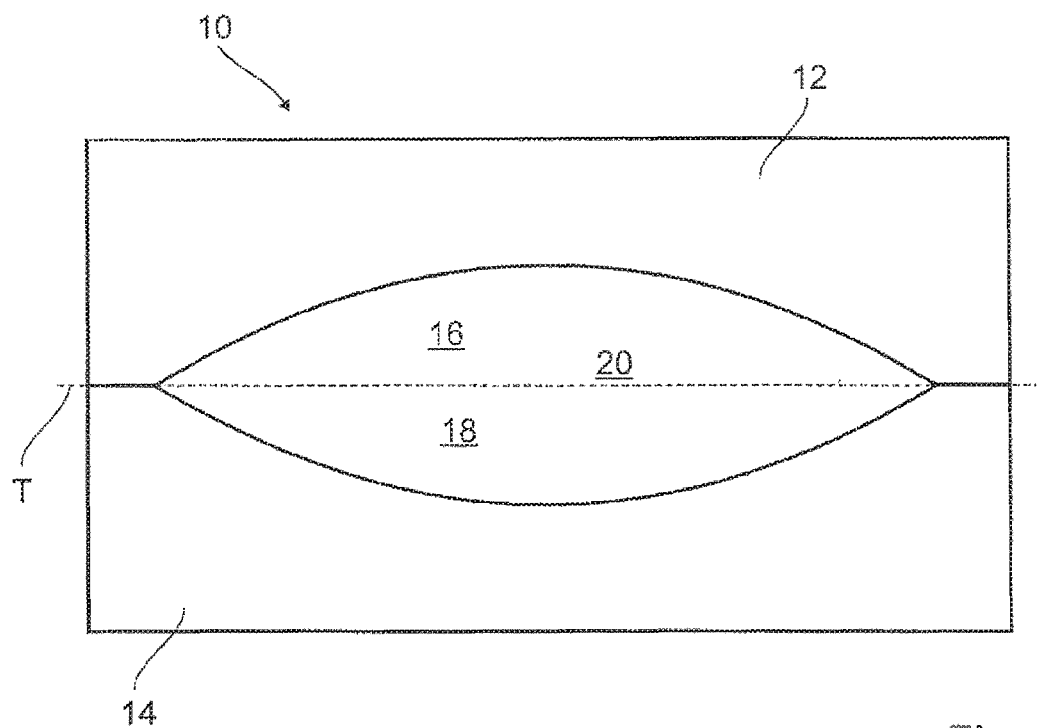
FIG. 1 is a schematic cross-section of the tool.

FIG. 1 shows a tool 10 for producing a fiber composite component which comprises two tool portions 12, 14 which are also referred to as tool halves. The two tool halves 12, 14 can be moved relative to each other, and they can assume an initial position (called the open position) in which the two tool portions 12, 14 are not in abutment with each other, and a production position which is shown in FIG. 1.

In the production position, the two tool portions 12, 14 are in abutment with each other in the separation plane T.

The two tool portions 12, 14 each have a partial cavity 16, 18 which in the production position are each combined to form a cavity 20 in which the fiber composite component is produced.

Furthermore, the tool 10 has a retention element 22 which is used to secure the completed fiber composite component. The retention element 22 is shown in FIGS. 2 to 4.

The retention element 22 has a retention portion 24 which is movable, in particular pivotable. A retention head 25 is provided at one end of the retention portion 24. The other end of the retention portion 24 is associated with a drive 26 via which the retention portion 22 is adjusted. The drive 26 is also part of the retention element 22.

The drive 26 may be a pyrotechnical, hydraulic or an electric drive.

Figure 2:
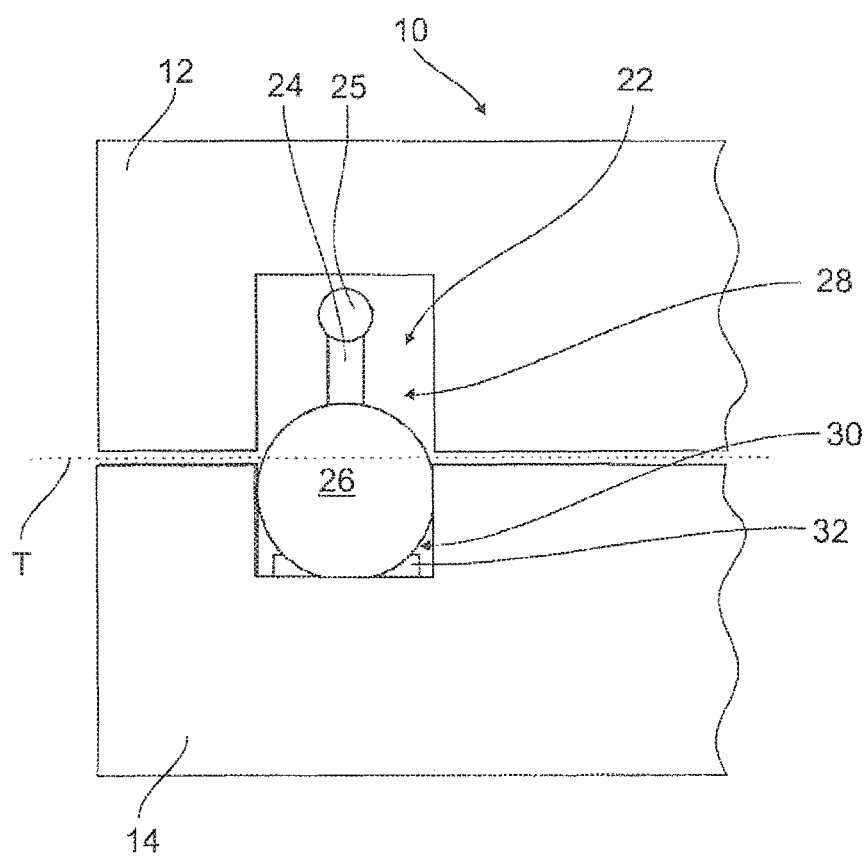
FIG. 2 is a cut-out of a side view of the tool.
Figure 3:
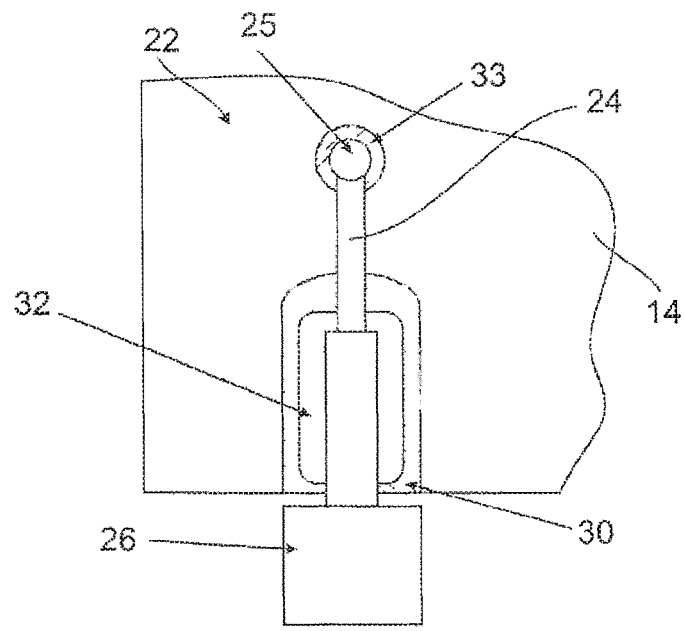
FIG. 3 is a cut-out of a plan view of the tool.
Figure 4:
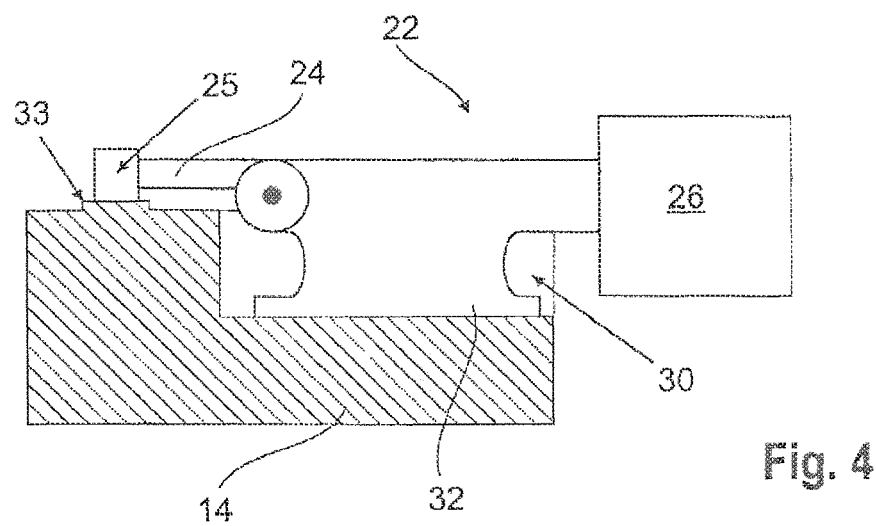
FIG. 4 is a side view of the portion depicted in FIG. 3.

The retention portion 24 can be adjusted in particular through 90°, as explained by a comparison of FIGS. 2 and 4, which are a rear view and a side view of the tool 10 when looking toward the retention element 22, wherein the retention element 22 is shown in FIG. 2 in the initial position thereof and in FIG. 4 in the retention position thereof.

An example of the construction of the retention element 22 is a tensioner.

In FIG. 2, it can further be seen that the tool portions 12, 14 each have a recess 28, 30 in which the retention element 22 is received.

The retention element 22 is arranged in the tool 10 in such a manner that it is associated with one of the two tool portions (in this instance: the tool portion 14) since it is arranged via a base 32 in the recess 30 of the tool portion 14. The tool portion 24 extends in contrast in the initial position through the recess 28 of the opposing tool portion 12 (FIG. 2).

The retention element 22 fixes the completed fiber composite component in the associated tool portion 14 after it has been produced. This is carried out as follows:

The fiber composite component is produced in the tool 10 if the two tool portions 12, 14 are moved closer to each other and are located in the production position. During the production position of the tool 10, the retention element 22 is in the initial position thereof shown in FIG. 2.

In the initial position, the retention portion 24 is located in the recess 28 of the tool portion 12, wherein the movable retention portion 24 extends perpendicularly to the separation plane T. The retention element 22 is consequently not located inside the cavity 20 during the production of the fiber composite component so that no movable portions are arranged there.

After the hardening of the fiber composite component, the two tool portions 12, 14 are moved apart in the separation plane T, wherein previously or at the same time, the retention element 22 or the retention portion 24 is adjusted via the drive 26 so that the retention portion 24 is moved through the recess 28 into the retention position shown in FIGS. 3 and 4.

In this instance, the retention portion 24 pivots through 70° in such a manner that it contacts the completed fiber composite component through the recess 28 from above and after it has been produced retains it in the tool portion 14 or the partial cavity 18 in a fixing manner.

As a result of the recess 28 in the tool portion 12, it is ensured that the retention portion 24 can move into contact with the completed fiber composite component before the two tool portions 12, 14 are moved apart.

The retention element 22 may in this instance be in direct abutment with the retention head 25 against the finished fiber composite component or, as can be seen in FIGS. 3 and 4, may cooperate a support face 33 which is constructed as a step in the tool portion 14. The completed fiber composite component is then retained by the retention portion 24. In this instance, the dimensions of the retention head 25 and those of the support face have to be adapted accordingly to the arrangement of the fiber composite component in the tool portion 14.

Alternatively, the tool 10 comprises two retention elements 22a, 22b.

A retention element 22a, 22b is arranged in each case in a tool portion 12, 14, wherein the first retention element 22a is associated with the predefined tool portion 12, from which the completed fiber composite component is intended to be removed. The second retention element 22b is associated with the other tool portion 14.

The two retention elements 22a, 22b may in particular be constructed in an identical manner, wherein the retention element 22 shown in FIG. 2 shows the first retention element 22a. The second retention element 22b is arranged in a similar manner in the tool 10. In order to illustrate the second retention element 22b, only the reference numerals of the tool portions 12, 14 have to be exchanged in FIG. 2.

The two retention elements 22a, 22b are controlled in a time-delayed manner so that the completed fiber composite component is arranged in the predefined tool portion 12 after the tool portions 12, 14 have been moved apart. This is carried out as follows:

After the fiber composite component has hardened, the two tool portions 12, 14 are first moved slightly apart. In this instance, the second retention element 22b is actuated so that it retains the completed fiber composite component on the tool portion 14. The fiber composite component is thereby initially released from the predefined tool portion 12.

Subsequently, the two tool portions 12, 14 can be moved back together, for example, as far as the production position or only a part-way thereof.

In this position, the second retention element 22b is released again so that it moves into the initial position thereof and no longer retains the fiber composite component on the tool portion 14. At the same time as, or directly after the release of the second retention element 22b, the first retention element 22a is actuated in order to retain the fiber composite component on the predefined tool portion 12.

Alternatively, the two tool portions 12, 14 also cannot be moved toward each other again so that the transfer of the fiber composite component is carried out directly in the position in which the tool portions have been moved slightly apart from each other.

Subsequently, the two tool portions 12, 14 are moved completely apart so that the fiber composite component produced can be removed from the predefined tool portion 12.

It is thereby ensured that the completed fiber composite component is retained in the predefined tool portion 12 and is additionally released from the surface thereof so that it can be readily removed.

Figure 5:
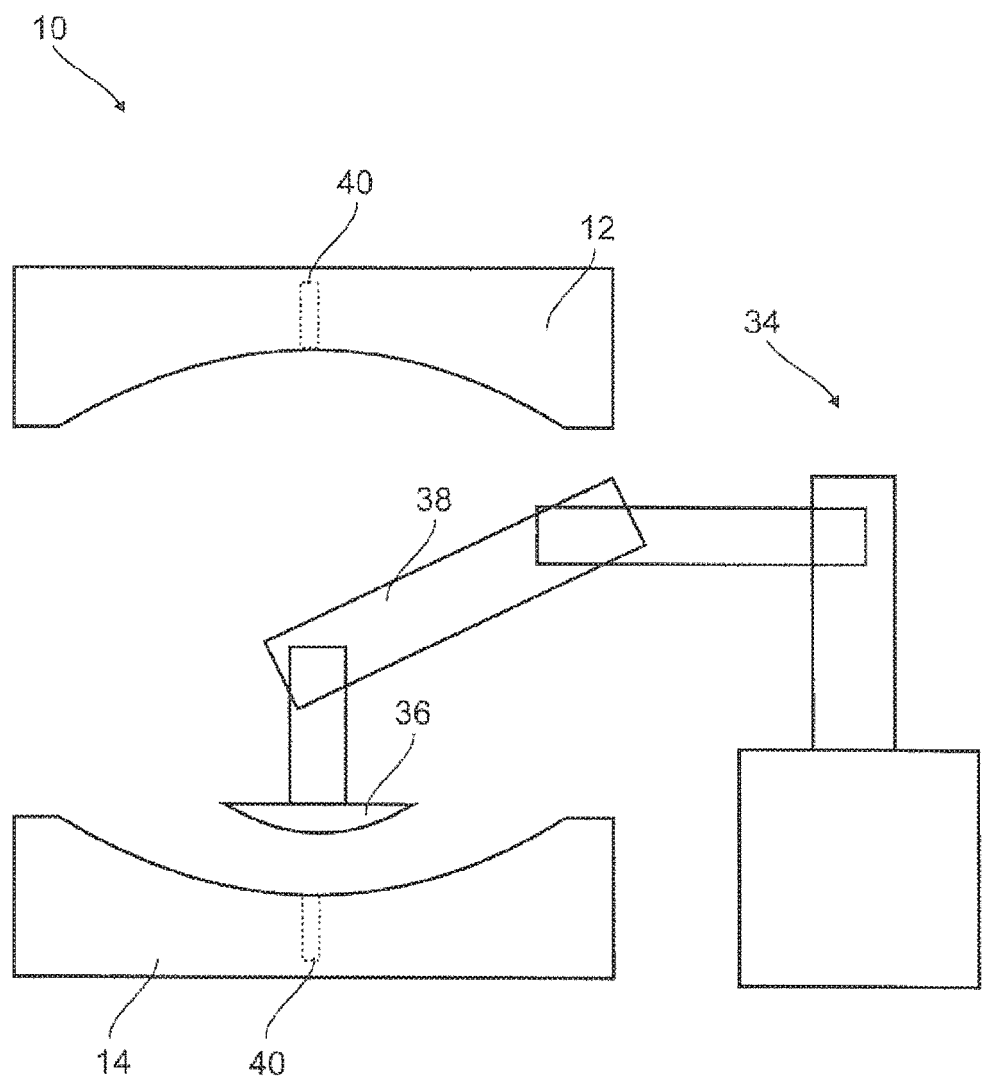
FIG. 5 is a schematic illustration of the tool.

FIG. 5 shows another embodiment, wherein the tool 10 additionally has a removal element 34 which inter alia comprises a vacuum suction device 36.

Via the removal element 34 and the vacuum suction device 36, the completed fiber composite component can be removed from the predefined tool portion 12, 14.

The removal element 34 is constructed in the embodiment shown as a robot with a movable articulation arm 38 so that the fiber composite component which has been removed can be conveyed directly to the next station.

An embodiment of the invention makes a provision for the tool 10 to comprise air ejectors 40 which are illustrated with dashed lines in FIG. 5. The air ejectors 40 may be associated with one of the tool portions 12, 14 or both tool portions 12, 14, as shown. The air ejectors 40 are on the surface of the compressed air channels Which terminate the partial cavity 18 and which are provided in the tool portion 14.

The air ejectors 40, which are provided in the tool portion 14 which corresponds to the one in which the fiber composite component produced is retained by the retention element 22, support the removal of the completed fiber composite component by the removal element 34 by compressed air being blown out after pressing and opening the tool 10.

The air ejectors 40 which are provided on the other tool portion 12 also support the release of the fiber composite component from the surface of the partial cavity 16 when the tool 10 is opened.

The air ejectors 40 may be provided alternatively to the two retention elements 22a, 22b or in addition thereto.

There is generally a provision for the surfaces of the partial cavities 16, 18 to have a slight roughness, whereby the removal of the fiber composite component is supported. The surfaces may be coated, plasma-nitrided or chromium-plated in order to produce high-quality surfaces which support the production of the fiber composite component and the removal thereof. If the surfaces are plasma-nitrided, they may in particular also be mirror-polished.

With the tool 10 according to the embodiments of the invention, operationally reliable removal of the tool 10 from the mold is ensured, wherein the completed fiber composite component is always located in a predefined tool portion after removal from the mold. Automatic series operation which is not susceptible to malfunction is thereby possible.

The foregoing disclosure has been set forth merely to illustrate the invention and is not intended to be limiting. Since modifications of the disclosed embodiments incorporating the spirit and substance of the invention may occur to persons having ordinary skill in the art, the invention should be construed to include everything within the scope of the appended claims and equivalents thereof.

What is claimed is:

1. A tool for producing a fiber composite component, the tool comprising:
   at least two tool portions, each tool portion defining half of a first recess, the at least two tool portions being moved together in a production position in such a manner that they form a cavity, in which cavity the fiber composite component is produced; and
   a retention element that is associated with at least a first tool portion, the retention element being configured to retain the fiber composite component produced in the first tool portion when the tool portions are moved apart after the production of the fiber composite component, wherein
   the first recess encapsulates at least the retention element and a pivotable retention portion, and
   the retention element is pivotable between: i) an initial position when the tool portions are moved together, and ii) a retention position, that is different from the initial position, just before the tool portions are moved apart, along a first axis of the tool the first recess and the cavity are equal in size, and along a second axis of the tool the cavity is larger than the first recess, the retention element is a pneumatically, hydraulically or electrically actuatable tensioner, the tool portions each have surfaces with which the fiber composite component to be produced is in contact, the surfaces are plasma-nitrided, mirror-polished or chromium-plated, and the tool has a removal element which removes the fiber composite component produced from the tool.

2. The tool as claimed in claim 1, wherein the retention portion has a first end that is connected to a drive and a second end that defines a mounting head.

3. The tool as claimed in claim 1, wherein the removal element comprises at least one vacuum suction device via which the fiber composite component produced is removable.

4. The tool as claimed in claim 1, wherein the removal element is a robot with a movable arm.

5. The tool as claimed in claim 4, wherein at least one air ejector is provided in at least one of the tool portions.

6. The tool as claimed in claim 5, wherein the retention element is provided in both tool portions.

7. The tool as claimed in claim 3, wherein the removal element is a robot with a movable arm.

* * * * *